(12) United States Patent

Raoul

(10) Patent No.: US 9,656,522 B2
(45) Date of Patent: May 23, 2017

(54) ASSISTANCE METHOD FOR ADJUSTING THE PRESSURE OF A TIRE FITTED TO A WHEEL MOUNTED ON A MOTOR VEHICLE

(71) Applicants: CONTINENTAL AUTOMOTIVE FRANCE, Toulouse (FR); CONTINENTAL AUTOMOTIVE GMBH, Hannover (DE)

(72) Inventor: Corine Raoul, Launaguet (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/902,751

(22) PCT Filed: Jun. 26, 2014

(86) PCT No.: PCT/EP2014/001739
§ 371 (c)(1),
(2) Date: Jan. 4, 2016

(87) PCT Pub. No.: WO2015/000564
PCT Pub. Date: Jan. 8, 2015

(65) Prior Publication Data
US 2016/0167461 A1    Jun. 16, 2016

(30) Foreign Application Priority Data

Jul. 4, 2013   (FR) ..................................... 13 56587

(51) Int. Cl.
*G06F 7/00*       (2006.01)
*B60C 23/04*    (2006.01)
*B60C 23/00*    (2006.01)

(52) U.S. Cl.
CPC ........ *B60C 23/0474* (2013.01); *B60C 23/002* (2013.01); *B60C 23/0406* (2013.01); *B60C 23/0477* (2013.01); *B60C 23/0484* (2013.01)

(58) Field of Classification Search
CPC .................. B64C 23/0474; B64C 23/0408
See application file for complete search history.

(56) References Cited

U.S. PATENT DOCUMENTS

| 5,674,332 A | 10/1997 | Battocchio |
| 2007/0113635 A1* | 5/2007 | Corniot ............... B60C 23/0408 73/146 |

(Continued)

FOREIGN PATENT DOCUMENTS

| CN | 102209643 | 10/2011 |
| CN | 102862449 | 1/2013 |
| EP | 2 199 116 A2 | 6/2010 |

OTHER PUBLICATIONS

International Search Report, dated Oct. 7, 2014, from corresponding PCT Application.

*Primary Examiner* — Imran Mustafa
(74) *Attorney, Agent, or Firm* — Young & Thompson

(57) ABSTRACT

An assistance method for adjusting the pressure of a tire mounted on a wheel of a motor vehicle having an electronic module adapted to transmit, to an on-board central unit in the vehicle, signals including data representing the pressure of the associated tire, this assistance method includes, in the first place, during an action of adjusting the pressure of a tire, determining, after receiving a number n of initial measurement signals, where n≥2, the gradient or slope Cd of the straight line representing the variation of the measured value Pm(t) of the pressure as a function of time. Next, on receiving each subsequent measurement signal, the remaining time required to obtain the setpoint pressure Pc is deduced from the ratio |Pc−Pm(t)|/Cd, and, on the expiry of (Continued)

Figure 1:
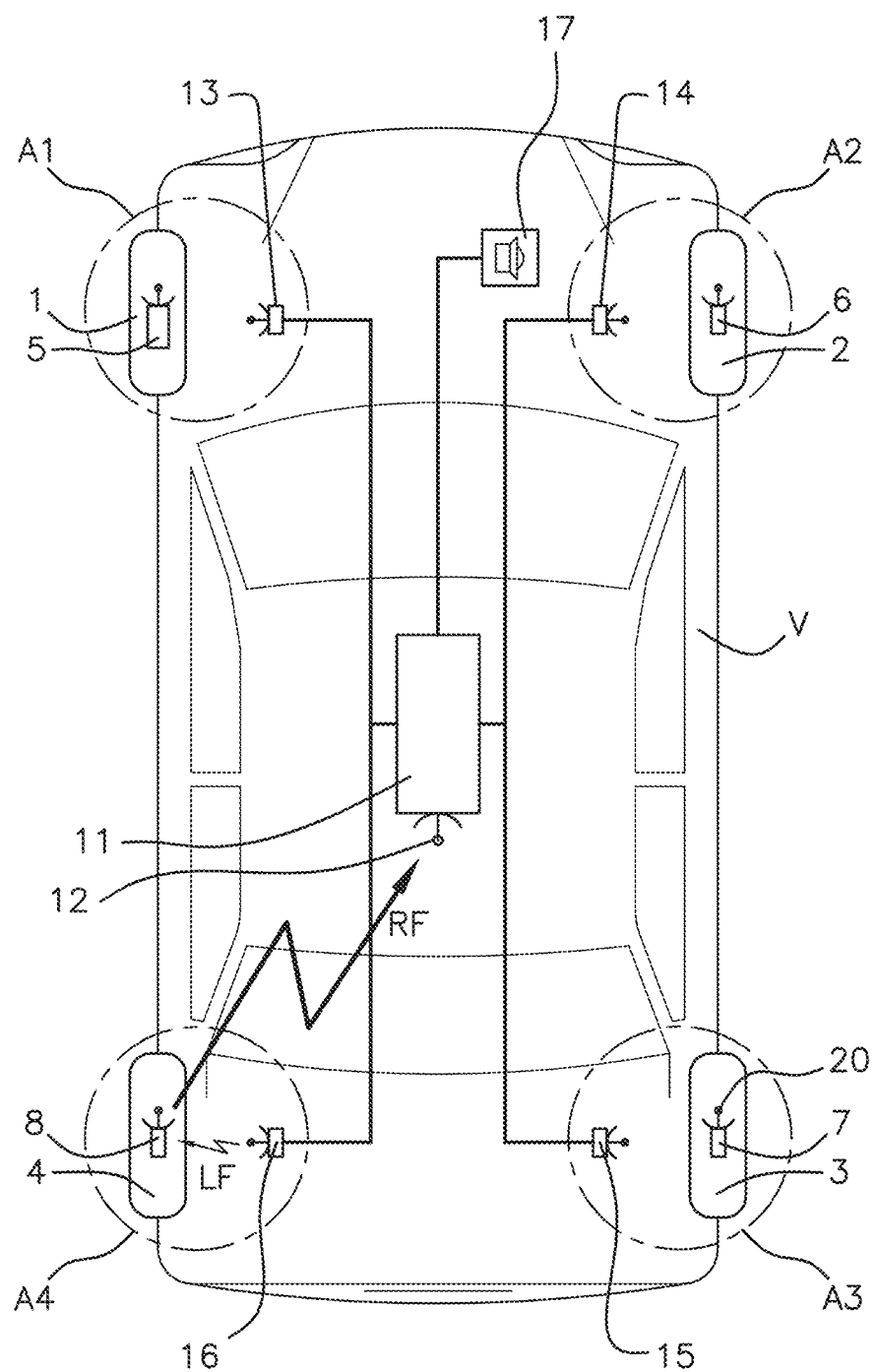

this remaining time, initiating a procedure for managing the cessation of the pressure adjustment, and signaling the end of the adjustment.

12 Claims, 3 Drawing Sheets

(56) References Cited

U.S. PATENT DOCUMENTS

| | | | |
|---|---|---|---|
| 2008/0266073 A1* | 10/2008 | Tu | B60C 23/0406 340/442 |
| 2011/0220325 A1 | 9/2011 | Hino | |
| 2013/0009763 A1 | 1/2013 | Koga | |

* cited by examiner

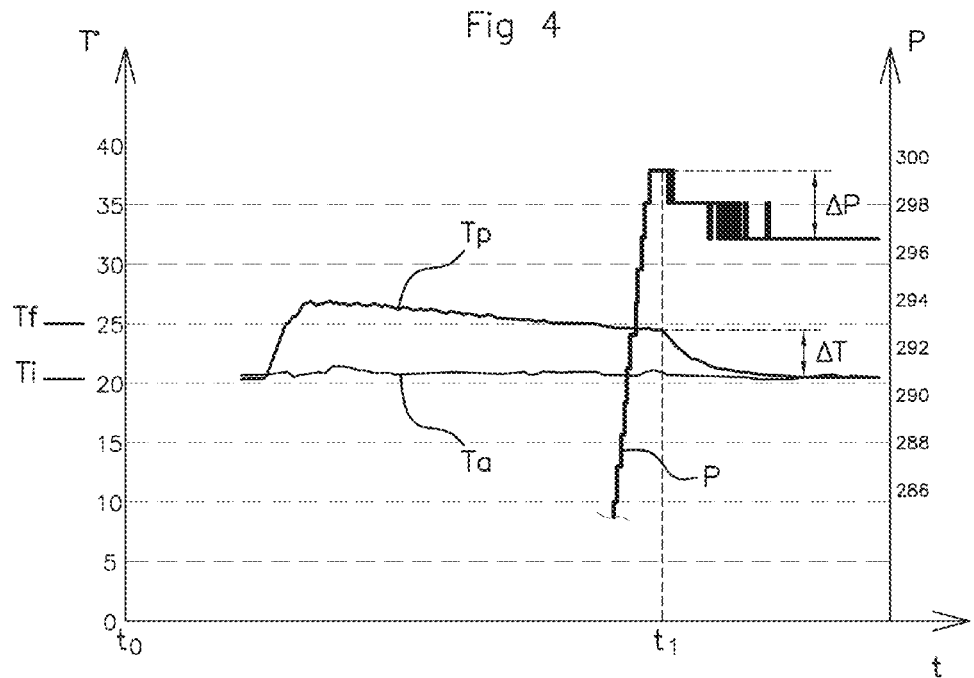
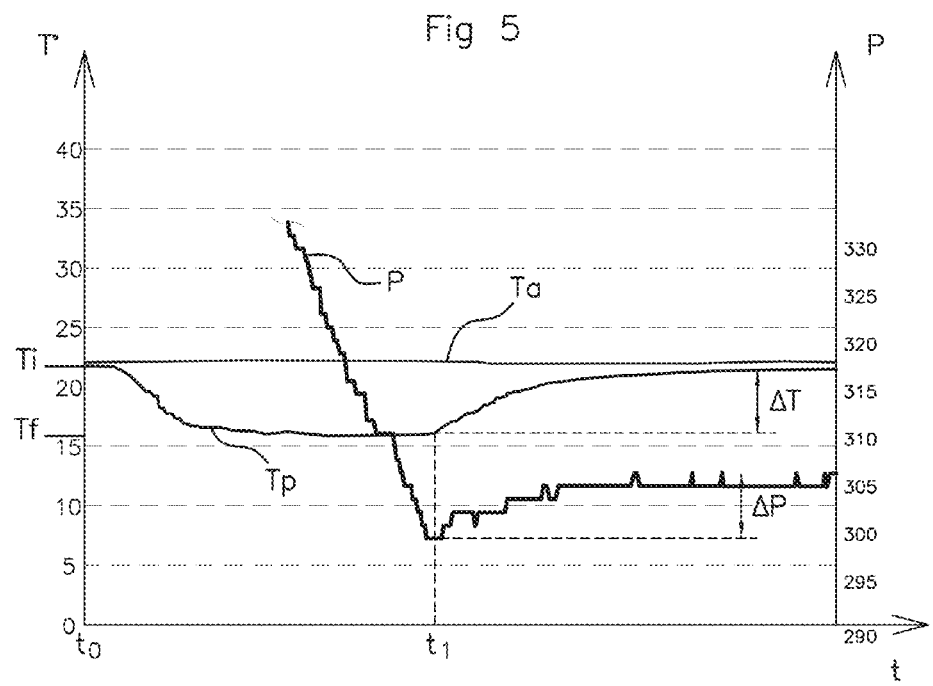

ASSISTANCE METHOD FOR ADJUSTING THE PRESSURE OF A TIRE FITTED TO A WHEEL MOUNTED ON A MOTOR VEHICLE

BACKGROUND OF THE INVENTION

Field of the Invention

The invention relates to an assistance method for adjusting the pressure of a tire fitted to a wheel mounted on a motor vehicle. This adjustment may consist in inflation or deflation.

Description of the Related Art

Increasing numbers of motor vehicles are provided, for safety purposes, with monitoring systems including sensors mounted on each of the wheels of the vehicle, used for measuring parameters such as the pressure or temperature of the tires fitted to these wheels, and intended to inform the driver of any abnormal change in the measured parameter.

These monitoring systems conventionally comprise an electronic module mounted on each wheel, adapted to transmit, to a central unit positioned in the vehicle, signals comprising an identification code of said electronic module and data enabling the pressure of the associated tire to be determined.

In addition to their main function of monitoring the operating parameters of the tires, these monitoring systems also have other functions such as a function of assistance in the adjustment (inflation/deflation) of the pressure of the tires.

At the present time, the assistance method used for the purpose of providing this assistance function usually consists in the following procedures, performed during an action of adjusting the pressure of the tire of a wheel:
transmission, by the electronic module fitted to this wheel, of a sequence of signals, called measurement signals, each comprising data for determining a measured value $Pm(t)$ of the tire pressure,
comparison by the central unit, on the receipt of each measurement signal, of the measured value $Pm(t)$ of the pressure with a predetermined setpoint value $Pc$,
and then, if the measured value $Pm(t)$ of the pressure corresponds to the value of the setpoint pressure $Pc$, a procedure of managing the cessation of the pressure adjustment action, comprising a final step of signaling the end of said adjustment action.

The drawback of this assistance method is that it is necessary to wait for a measurement signal delivered by the electronic module fitted to the wheel in order to update the data required for the assistance function. Consequently, the accuracy of the real value of the pressure obtained is determined by the periodicity of transmission of the measurement signals, and this accuracy may be highly random, notably if the periodicity of transmission of the measurement signals is low (for example, in what is known as the "parking" mode of operation of the electronic modules, for which the periodicity of the measurements reaches a duration of about 15 to 30 seconds), and/or when the type of compressor installed in service stations, having a high free air delivery, is used.

SUMMARY OF THE INVENTION

The present invention is intended to overcome this drawback and has the main object of providing an assistance method for increasing, in an optimal way, the accuracy of the value of the pressure obtained relative to the setpoint value.

For this purpose, the invention proposes an assistance method for adjusting the pressure of a tire mounted on a wheel of a motor vehicle equipped with an electronic module adapted to transmit, to an on-board central unit in said vehicle, signals comprising data enabling the pressure of the associated tire to be determined, said assistance method consisting in the following procedures, during an action of adjusting the pressure of the tire of a wheel:
transmission, by the electronic module fitted to this wheel, of a sequence of signals, called measurement signals, each comprising data for determining a measured value $Pm(t)$ of the tire pressure,
if the measured value $Pm(t)$ of the pressure corresponds to a predetermined value of setpoint pressure $Pc$, a procedure of managing the cessation of the pressure adjustment action, comprising a final step of signaling the end of said adjustment action.

According to the invention, this assistance method is characterized in that:
initially, after the reception of a number n of initial measurement signals, where n≥2, the gradient or slope $Cd$ of the straight line representing the variation of the measured value $Pm(t)$ of the pressure as a function of time is determined, and then,
on reception of each subsequent measurement signal, the remaining time required to reach the setpoint pressure $Pc$ is deduced from the ratio $|Pc-Pm(t)|/Cd$, and, if this remaining time expires before the reception, or simultaneously with the reception, of a new measurement signal, the procedure for managing the cessation of the pressure adjustment action is initiated.

It should be noted that the expression "if the measured value $Pm(t)$ of the pressure corresponds to a value of setpoint pressure $Pc$" means that the pressure $Pm(t)$ is equal to $Pc$ or, at least, lies within a predetermined range of values centered on $Pc$.

This assistance method is equivalent, in terms of monitoring the variation in pressure of a tire, to a method consisting in the continuous measurement of this pressure, so that the accuracy of the resulting pressure value, compared with the setpoint value, is found to be optimal because it is not dependent on the periodicity of transmission of the measurement signals, and therefore, notably, is not affected by the use of compressors having a high free air delivery.

According to an advantageous embodiment of the assistance method according to the invention:
each wheel is equipped with means for measuring the temperature of the air volume inside the tire,
in a preliminary step, a correspondence table is drawn up for each type of wheel fitted to the vehicle, this table:
comprising inputs consisting, on the one hand, of what are called initial temperatures $T_i$, corresponding to temperatures measured inside a tire when an action of adjusting the pressure of this tire is initiated, and, on the other hand, of what are called final temperatures $T_f$, corresponding to temperatures measured inside the tire when the action of adjusting the pressure of this tire is interrupted,
associating with each pair of temperatures $(T_i, T_f)$ a pressure value $\Delta P$ corresponding to the determined pressure variation, before stabilization (that is to say at the moment when the inflation/deflation procedure ceases), at the end of an adjustment action that started at an initial temperature $T_i$ and was interrupted at a final temperature $T_f$, and, during each action of adjusting the pressure of a tire, the initial temperature $T_i$ is determined when this action of adjustment is initiated, and, when the setpoint pressure Pc is obtained, a procedure of managing the action of adjusting the pressure is executed, consisting in:

measuring the final temperature $T_f$, and determining, by consulting the correspondence table, the pressure value $\Delta P$ associated with the pair of temperatures ($T_i$, $T_f$), and causing the execution of the final step of signaling the end of the adjustment action, after a time lapse equivalent to $\Delta P/Cd$ following the instant at which the setpoint pressure Pc is obtained.

This embodiment is based on the discovery, according to the invention, that, following an action of adjusting the pressure of a tire, in which the temperature inside the tire varies between an initial value $T_i$ and a final value $T_f$:

the temperature inside the tire undergoes, after the cessation of the inflation/deflation but before stabilization, a variation consisting in a temperature decrease, if $T_f > T_i$, or a temperature increase, if $T_f < T_i$, having a specific value for each pair of values ($T_i$, $T_f$), the pressure of the tire undergoes, according to Charles' law, a variation proportional to that of the temperature, and also having a specific value for the pair of values ($T_i$, $T_f$).

On the basis of this finding, the invention therefore makes it possible to counteract this phenomenon of pressure variation at the time of cessation of the inflation/deflation, and thus to obtain a final pressure which is optimally close to the setpoint pressure.

According to another advantageous embodiment of the assistance method according to the invention:

the types of compressors that may be used for adjusting the pressure of a motor vehicle tire are divided into at least two categories, each characterized by a predetermined range of values of free air delivery, and a specific range of correspondence tables is drawn up for each category of compressor, and, during each action of adjusting the pressure of a tire, the category of the compressor used is determined according to the value Cd of the slope.

This is because it has been found that the values of the variations $\Delta T$ and $\Delta P$ may show, for identical pairs ($T_i$, $T_f$), differences which are functions of the free air delivery of the compressors, and therefore of the time taken to obtain this temperature difference $T_f - T_i$ during an action of adjusting the pressure of a tire. This classification of the compressors as a function of their free air delivery can be used to reduce the size of these differences in variation $\Delta T$ and $\Delta P$.

The assistance method according to the invention described above can be used, notably, for adjusting the pressure of a tire fitted to a wheel mounted on a motor vehicle having a plurality of transmitters positioned on the vehicle so that each wheel position is covered by the transmission area of one or two transmitters, each of these transmitters being controlled by the central unit so as to transmit signals requesting the transmission of predetermined data, such as, notably, an identification request signal, to each electronic module located in its transmission area.

In this case, and in this advantageous manner according to the invention, on the expiry of the remaining time before the reception of a new measurement signal, the central unit is programmed, on this expiry, to cause:

the transmission, by a transmitter whose transmission area covers the electronic module associated with the tire undergoing pressure adjustment, of at least one signal requesting the transmission of a measurement signal, the initiation of the procedure for managing the cessation of the pressure adjustment action, if the measured value of the pressure Pm(t) calculated on the basis of the data delivered by the measurement signal corresponds to the setpoint pressure Pc.

Evidently, this assistance method can also be used for adjusting the pressure of a tire fitted to a wheel mounted on a motor vehicle having no transmitters. In this case, on the expiry of the remaining time before the reception of a new measurement signal, the central unit is programmed to directly cause the initiation of the procedure of managing the cessation of the pressure adjustment action.

Additionally and advantageously according to the invention, the final step of signaling the end of the adjustment action consists, in a conventional way, of causing a specific activation of audible and/or visual means for sending a specific sound and/or visual message in order to signal to the user that he must stop the pressure adjustment action.

BRIEF DESCRIPTION OF THE DRAWING FIGURES

Figure 2:
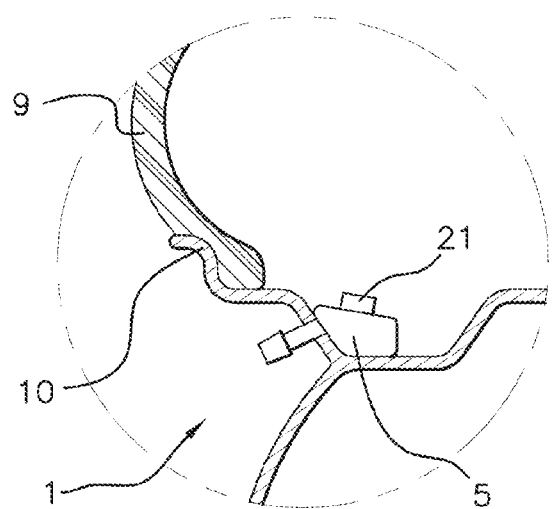
Figure 3:
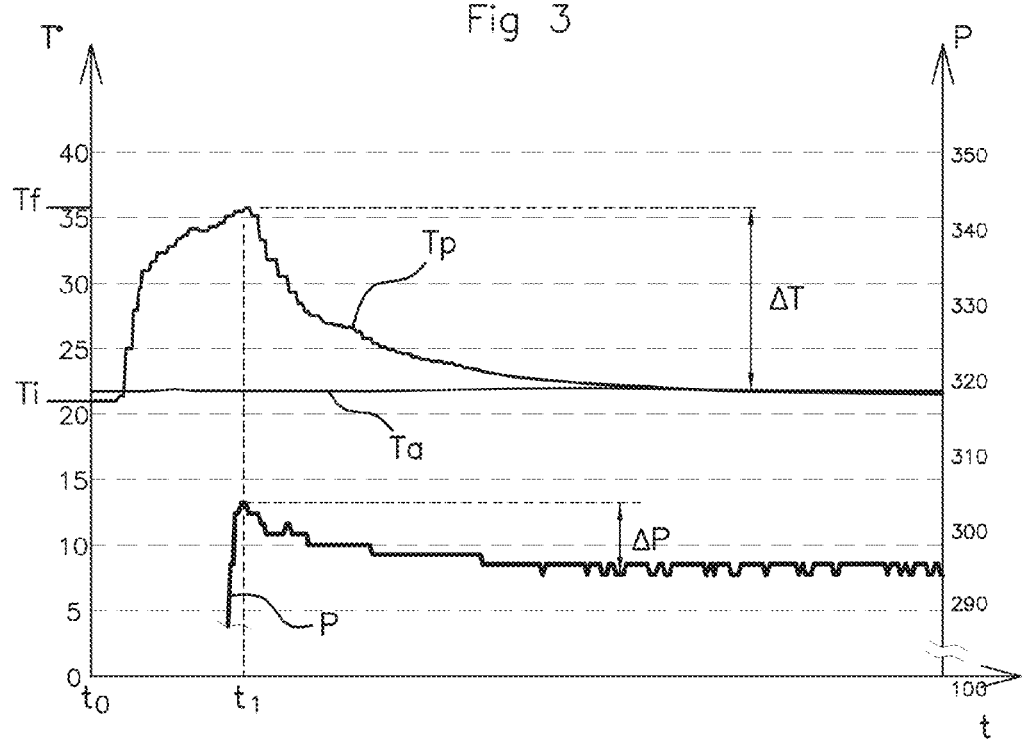

Other characteristic objects and advantages of the invention will be apparent from the following detailed description, referring to the attached drawings, which represent a preferred embodiment of the invention by way of non-limiting example. In these drawings:

FIG. 1 is a schematic top view of a vehicle provided with a monitoring system allowing the execution of the assistance method according to the invention for adjusting the pressure of a tire, FIG. 2 is a detail view in cross section, on a larger scale, of a portion of a wheel equipped with an electronic module for the execution of the method according to the invention, FIG. 3 is a graph showing the variation of the temperature and pressure inside a tire during the inflation of the tire by a compressor having a high free air delivery, FIG. 4 is a graph showing the variation of the temperature and pressure inside a tire during the inflation of the tire by a compressor having a low free air delivery, and FIG. 5 is a graph showing the variation of the temperature and pressure inside a tire during the deflation of the tire.

DETAILED DESCRIPTION OF THE INVENTION

The method according to the invention proposes a function of assistance for adjusting the pressure of a tire fitted to a wheel mounted on a vehicle V equipped with a system for monitoring the operating parameters of the tires mounted on these wheels.

According to the example shown in FIG. 1, the monitoring system is installed in a vehicle V having four wheels, each comprising, in a conventional way, a rim 10 fitted with a tire 9 (see FIG. 2), these wheels consisting of two front wheels 1, 2 and two rear wheels 3, 4.

These monitoring systems conventionally comprise, in the first place, associated with each wheel 1-4, an electronic module 5-8 positioned within the casing of the tire 9 and, for example, fixed for this purpose to the rim 10 of said wheel as shown in FIG. 2, or fixed to the inner face of the tread of the tire 9 (not shown).

In a known way, each of these electronic modules 5-8 incorporates sensors dedicated to the measurement of parameters such as the pressure and/or temperature of the tire, connected to a microprocessor which has an identification code of said electronic module and which is linked to an RF transmitter connected to a low frequency antenna such as 20.

Additionally, according to the invention, each electronic module 5-8 is equipped with a temperature sensor 21 (FIG. 2) intended to measure the air temperature inside the tire 9. As shown in FIG. 2, this temperature sensor 21 is, in the example, fixed externally to the electronic module 5, by means of any known device enabling said temperature sensor and electronic module 5 to be thermally insulated.

The monitoring system also comprises a centralized computer or central unit 11, having a microprocessor and incorporating an RF receiver equipped with an antenna 12 for receiving the signals transmitted by each of the four (in the illustrated example) electronic modules 5-8.

Finally, this monitoring system comprises transmitters 13-16 controlled by the central unit 11, and intended, notably, to enable the electronic modules 5-8 to be located.

According to the example shown in FIG. 1, these transmitters 13-16 are four in number, each being placed near a wheel position in such a way that said wheel position is covered by the transmission area A1-A4 of this transmitter only.

The assistance method according to the invention comprises, in the first place, a preliminary step of drawing up correspondence tables, which are determined experimentally or by modeling for each type of wheel (rim 10 and tire 9), and which:
  comprise inputs consisting, on the one hand, of initial temperatures $T_i$, corresponding to temperatures measured inside a tire 9 by the temperature sensor 21 when an action of adjusting the pressure of this tire 9 is initiated (at the time $t_0$), and, on the other hand, of final temperatures $T_f$, corresponding to temperatures measured inside the tire 9 when the action of adjusting the pressure of this tire is interrupted (at the time $t_1$),
  associate with each pair of temperatures $(T_i, T_f)$ a pressure value ΔP corresponding to the determined pressure variation, before stabilization, at the end of an adjustment action that started at an initial temperature $T_i$ and was interrupted at a final temperature $T_f$.

These correspondence tables are drawn up by application of the principle discovered according to the invention, which establishes that, following an action of adjusting the pressure of a tire 9, in which the temperature inside the tire varies between an initial value $T_i$ and a final value $T_f$:
  the temperature inside the tire undergoes, after the cessation of the inflation/deflation but before stabilization, a variation (a temperature decrease, if $T_f > T_i$, or a temperature increase, if $T_f < T_i$) having a specific value for each pair of values $(T_i, T_f)$,
  the pressure of the tire undergoes a variation which is proportional to that of the temperature, and which therefore also has a specific value for the pair of values $(T_i, T_f)$.

Additionally, for the purpose of drawing up these correspondence tables:
  at least two categories of compressors that can be used for adjusting the pressure of a tire 9 of a motor vehicle V are defined, each of these categories being characterized by a predetermined range of values of free air delivery,
  and a specific range of correspondence tables is drawn up for each category of compressor.

By way of example, two categories of compressor can thus be created, consisting of compressors with low free air delivery providing a pressure gradient of less than 1.2 kPa/s inside the tire 9, and compressors with high free air delivery, corresponding to a pressure gradient of more than 1.2 kPa/s inside the tire 9.

FIG. 3 shows a graph based on the inflation of a tire 9 (between the instant $t_0$ and the instant $t_1$), using a compressor with high free air delivery (the gradient being 8 kPa), during which the pressure of the tire 9 is raised from 100 kPa to 300 kPa. This graph also shows the variation of the temperature Tp inside the tire 9, the variation of the pressure P of the tire 9 and the variation of the ambient temperature Ta. It should be noted that the start of the pressure curve P has been omitted, in order to simplify this figure, and only the end of this pressure curve P is shown in FIG. 3.

This graph demonstrates that:
  after inflation (that is to say at the time $t_1$), the pressure (305 kPa) falls by a value ΔP of about 10 kPa before it becomes stable at about 295 kPa,
  the temperature Tp inside the tire 9 varies between an initial temperature $T_i$ (at the instant $t_0$ of the start of inflation) of about 21° C. and a final temperature $T_f$ (at the instant $t_1$ of the end of inflation) of about 36° C. on the cessation of inflation, before falling by a value ΔT substantially equal to 15°.

According to the operating principle established by the invention, this graph can be used to associate a value ΔP of 10 kPa with the pair of temperatures (Ti, Tf) equal to (21° C., 36° C.) in the correspondence table drawn up for the type of wheel used for testing.

Similarly, FIG. 4 shows a graph based on the inflation of a tire 9 with a compressor having a low free air delivery, and this graph can be used to associate a value ΔP of 2 kPa with the pair of temperatures (Ti, Tf) equal to (20° C., 25° C.) in the correspondence table drawn up for the type of wheel used for testing.

FIG. 5, for its part, shows a graph based on the deflation of a tire 9 (between a deflation start time $t_0$ and a deflation stop time $t_1$), and can be used to associate a value ΔP of 4 kPa with the pair of temperatures (Ti, Tf) equal to (22° C., 16° C.) in the correspondence table drawn up for the type of wheel used for testing.

The assistance method according to the invention, for its part, starts at the time $t_0$, when the central unit 11 receives an information signal from an electronic module 5-8, comprising the identification code of the latter and what is called the initial value $T_i$ of the temperature inside the associated tire 9, this information signal being transmitted when said electronic module detects pressure variations representing an action of adjusting the pressure of the tire 9.

This assistance method consists, in the first place, in causing the transmission, by the transmitter 13-16 whose transmission area A1-A4 covers the wheel position in which the electronic module 5-8 transmitting the information signal is located, of a sequence of LF (low frequency) signals requesting the transmission of measurement signals comprising measured data for the determination of the value of the tire pressure, in response to each of which signals said electronic module delivers a measurement signal.

After receiving the first n measurement signals, where n is generally equal to 2, the central unit 11 is programmed to calculate the gradient or slope Cd of the straight line representing the variation as a function of time of the measured value Pm(t) of the pressure, and, during an inflation action, to deduce from this value Cd the category of compressor used.

Next, on receiving each of the subsequent measurement signals, the central unit 11 deduces from the ratio |Pc-Pm(t)|/Cd the remaining time required to obtain the setpoint pressure Pc, and, on the expiry of this remaining time before the reception of a new measurement signal, or simultaneously with the reception of this signal, the central unit 11 causes:

the transmission, by the transmitter 13-16 whose transmission area covers the electronic module 5-8 associated with the tire 9 undergoing pressure adjustment, of at least one signal requesting the transmission of a measurement signal, and the initiation of the procedure for managing the cessation of the pressure adjustment action, if the measured value of the pressure Pm(t) calculated on the basis of the data delivered by the measurement signal corresponds to the setpoint pressure Pc, this procedure consisting in:

measuring the final temperature $T_f$ and determining, by consulting the correspondence table, the pressure value $\Delta P$ associated with the pair of temperatures ($T_i$, $T_f$), and causing the activation of audible and/or visual means 17 after a time lapse equivalent to $\Delta/Cd$ following the instant at which the setpoint pressure Pc is obtained.

This assistance method, used during an action of adjusting the pressure of a vehicle equipped with a monitoring system which may or may not be provided with transmitters, enables the accuracy of the value of the pressure obtained relative to the setpoint value to be increased in an optimal way.

It should also be noted that the data supplied by the temperature sensor 21 can be used not only for their function described above in the context of the use of the assistance method according to the invention, but also, because of the relationship present between the value of the temperature inside a tire 9 and the value of the pressure of this tire 9 for this temperature, for the continuous supply of accurate data on the inflation rate (that is to say, the amount of air or mass of air) of said tire.

Thus, in an example of application, it is possible, notably, to use a function of monitoring the mass of air inside the tire 9, enabling a fast or slow puncture to be detected, and enabling a continuous measurement to be made of the remaining mass of air and the speed at which this mass of air decreases.

This function can be used to inform the driver and to supply him with data concerning the time remaining (in hours or days) before reaching a critical pressure threshold that may adversely affect the driving conditions.

The invention claimed is:

1. An assistance method for adjusting the pressure of a tire mounted on a wheel of a motor vehicle equipped with an electronic module adapted to transmit, to an on-board central unit in said vehicle, signals comprising data enabling the pressure of the associated tire to be determined, said assistance method comprising the following procedures, during an action of adjusting the pressure of the tire of a wheel:

transmitting, by the electronic module fitted to this wheel, of a sequence of signals, called measurement signals, each comprising data for determining a measured value Pm(t) of the tire pressure, if the measured value Pm(t) of the pressure corresponds to a predetermined value of setpoint pressure Pc, a procedure of managing the cessation of the pressure adjustment action, comprising a final step of signaling the end of said adjustment action, initially, after the reception of a number n of initial measurement signals, where n≥2, the gradient or slope Cd of the straight line representing the variation of the measured value Pm(t) of the pressure as a function of time is determined, and then, on reception of each subsequent measurement signal, the remaining time required to reach the setpoint pressure Pc is deduced from the ratio |Pc-Pm(t)|/Cd, and, if this remaining time expires before the reception, or simultaneously with the reception, of a new measurement signal, the procedure for managing the cessation of the pressure adjustment action is initiated.

2. The assistance method as claimed in claim 1, wherein:

each wheel is equipped with means for measuring the temperature of the air volume inside the tire, in a preliminary step, a correspondence table is drawn up for each type of wheel fitted to the vehicle, this table:

comprising inputs consisting of initial temperatures $T_i$, corresponding to temperatures measured inside a tire when an action of adjusting the pressure of this tire is initiated ($t_0$), and of final temperatures $T_f$, corresponding to temperatures measured inside the tire when the action of adjusting the pressure of this tire is interrupted ($t_1$), associating with each pair of temperatures ($T_i$, $T_f$) a pressure value $\Delta P$ corresponding to the determined pressure variation, before stabilization, at the end of an adjustment action that started at an initial temperature $T_i$ and was interrupted at a final temperature $T_f$, and, during each action of adjusting the pressure of a tire, the initial temperature $T_i$ is determined when this action of adjustment is initiated, and, when the setpoint pressure Pc is obtained, a procedure of managing the cessation of the action of adjusting the pressure is executed, which comprises:

measuring the final temperature $T_f$ and determining, by consulting the correspondence table, the pressure value $\Delta P$ associated with the pair of temperatures ($T_i$, $T_f$), and causing the execution of the final step of signaling the end of said adjustment action, after a time lapse equivalent to $\Delta P/Cd$ following the instant at which the setpoint pressure Pc is obtained.

3. The assistance method as claimed in claim 2, further comprising:

dividing the types of compressors that may be used for adjusting the pressure of a tire of a motor vehicle (V) into at least two categories, each characterized by a predetermined range of values of free air delivery, drawing up a specific range of correspondence tables for each category of compressor, and, during each action of adjusting the pressure of a tire, determining the category of the compressor used according to the value Cd of the slope.

4. The assistance method as claimed in claim 3, for a motor vehicle having a plurality of transmitters positioned on the vehicle so that each wheel position is covered by the transmission area of one or two transmitters, each of these transmitters being controlled by the central unit so as to transmit signals requesting the transmission of predetermined data, such as, notably, an identification request signal, to each electronic module located in its transmission area, wherein, on the expiry of the remaining time before the reception of a new measurement signal, the central unit is programmed, on this expiry, to cause:

the transmission, by a transmitter whose transmission area covers the electronic module associated with the tire undergoing pressure adjustment, of at least one signal requesting the transmission of a measurement signal, and the initiation of the procedure for managing the cessation of the pressure adjustment action, if the measured value of the pressure Pm(t) calculated on the basis of the data delivered by the measurement signal corresponds to the setpoint pressure Pc.

5. The assistance method as claimed in claim 1, according to which the final step of signaling the end of the adjustment action consists in causing the activation of audible and/or visual means.

6. The assistance method as claimed in claim 2, according to which the final step of signaling the end of the adjustment action consists in causing the activation of audible and/or visual means.

7. The assistance method as claimed in claim 3, according to which the final step of signaling the end of the adjustment action consists in causing the activation of audible and/or visual means.

8. The assistance method as claimed in claim 4, according to which the final step of signaling the end of the adjustment action consists in causing the activation of audible and/or visual means.

9. The assistance method as claimed in claim 1, wherein the on-board central unit includes a microprocessor and incorporating an RF receiver equipped with an antenna for receiving the signals transmitted by the electronic module.

10. The assistance method as claimed in claim 1, wherein there are four electronic modules.

11. The assistance method as claimed in claim 1, wherein transmitters are controlled by the central unit.

12. The assistance method as claimed in claim 11, wherein there are four transmitters, each transmitter being placed near a wheel position in such a way that said wheel position is covered by a transmission area of this transmitter only.

\* \* \* \* \*